US008946101B2

(12) United States Patent
Moulton et al.

(10) Patent No.: US 8,946,101 B2
(45) Date of Patent: Feb. 3, 2015

(54) ENHANCED BARRIER MULTIFUNCTIONAL COATINGS FOR NYLON FILMS

(75) Inventors: Jeffrey D. Moulton, Morristown, NJ (US); Simon J. Porter, Allentown, PA (US); Yuan-Ping R. Ting, Plainsboro, NJ (US)

(73) Assignee: Honeywell International Inc., Morristown, NJ (US)

( * ) Notice: Subject to any disclaimer, the term of this patent is extended or adjusted under 35 U.S.C. 154(b) by 860 days.

(21) Appl. No.: 12/700,827

(22) Filed: Feb. 5, 2010

(65) Prior Publication Data
US 2010/0203790 A1  Aug. 12, 2010

Related U.S. Application Data

(60) Provisional application No. 61/151,286, filed on Feb. 10, 2009.

(51) Int. Cl.
*B32B 27/30* (2006.01)
*B32B 27/12* (2006.01)
*B32B 27/14* (2006.01)
*B32B 5/18* (2006.01)
*D01D 5/12* (2006.01)
*B29C 63/00* (2006.01)
*B32B 27/20* (2006.01)
*B32B 5/02* (2006.01)
*B32B 7/12* (2006.01)
*B32B 27/34* (2006.01)
*E04B 1/78* (2006.01)
*E04B 1/62* (2006.01)
*E04B 1/74* (2006.01)

(52) U.S. Cl.
CPC . *B32B 27/20* (2013.01); *B32B 5/02* (2013.01); *B32B 7/12* (2013.01); *B32B 27/30* (2013.01); *B32B 27/34* (2013.01); *E04B 1/78* (2013.01); *B32B 2307/7242* (2013.01); *E04B 1/625* (2013.01); *E04B 2001/741* (2013.01)
USPC .......... 442/396; 442/75; 442/76; 442/85; 442/394; 264/210.1; 264/241

(58) Field of Classification Search
CPC ........... B32B 5/02; B32B 7/12; B32B 27/20; B32B 27/30; B32B 27/34; B32B 2307/7242; E04B 1/78; E04B 2001/741; E04B 1/625
USPC ............ 442/85, 394, 396, 75, 76; 264/210.1, 264/241
See application file for complete search history.

(56) References Cited

U.S. PATENT DOCUMENTS 4,677,017 A   6/1987 DeAntonis et al.
4,826,955 A   5/1989 Akkapeddi et al.
(Continued)

FOREIGN PATENT DOCUMENTS

JP    60-161703      8/1985
JP    08-500062 A    1/1995
(Continued)

*Primary Examiner* — Jeremy R Pierce

(57) ABSTRACT

High barrier multilayer films are disclosed that incorporate a selectively permeable outer layer and a moisture barrier nanocomposite membrane. More particularly, insulation facing materials and insulation articles can incorporate an insulation facing material having a variable vapor barrier. The facing materials can include a moisture barrier membrane that incorporates a nanoclay.

20 Claims, 1 Drawing Sheet

(56) References Cited

U.S. PATENT DOCUMENTS

| | | |
|---|---|---|
| 4,933,082 A | 6/1990 | Yamada et al. |
| 5,139,878 A | 8/1992 | Kim et al. |
| 5,391,423 A | 2/1995 | Wnuk et al. |
| 5,506,041 A | 4/1996 | Tanaka et al. |
| 5,541,267 A | 7/1996 | Akkapeddi et al. |
| 5,733,624 A | 3/1998 | Syme et al. |
| 5,746,854 A | 5/1998 | Romes et al. |
| 5,747,560 A | 5/1998 | Christiani et al. |
| 5,876,812 A | 3/1999 | Frisk et al. |
| 6,191,057 B1 | 2/2001 | Patel et al. |
| 6,357,504 B1 | 3/2002 | Patel et al. |
| 6,403,231 B1 | 6/2002 | Mueller et al. |
| 6,815,380 B2 | 11/2004 | Snyder |
| 6,924,243 B2 | 8/2005 | Snyder |
| 2004/0097157 A1* | 5/2004 | Cosentino ............ 442/394 |
| 2005/0000183 A1* | 1/2005 | Fay et al. ............ 52/506.01 |
| 2006/0052505 A1* | 3/2006 | Pagilagan ............ 524/445 |
| 2006/0068212 A1* | 3/2006 | Wilhoit et al. ............ 428/507 |
| 2006/0222797 A1* | 10/2006 | Bekele ............ 428/35.7 |
| 2007/0015424 A1* | 1/2007 | Toas et al. ............ 442/59 |
| 2007/0020451 A1 | 1/2007 | Padiyath et al. |
| 2008/0311813 A1* | 12/2008 | Ting et al. ............ 442/327 |
| 2009/0098395 A1* | 4/2009 | Lu ............ 428/454 |

FOREIGN PATENT DOCUMENTS

| | | |
|---|---|---|
| JP | 09-501331 A | 2/1997 |
| KR | 10-2008-0036042 A | 4/2008 |
| WO | 94-28846 A1 | 12/1994 |

* cited by examiner

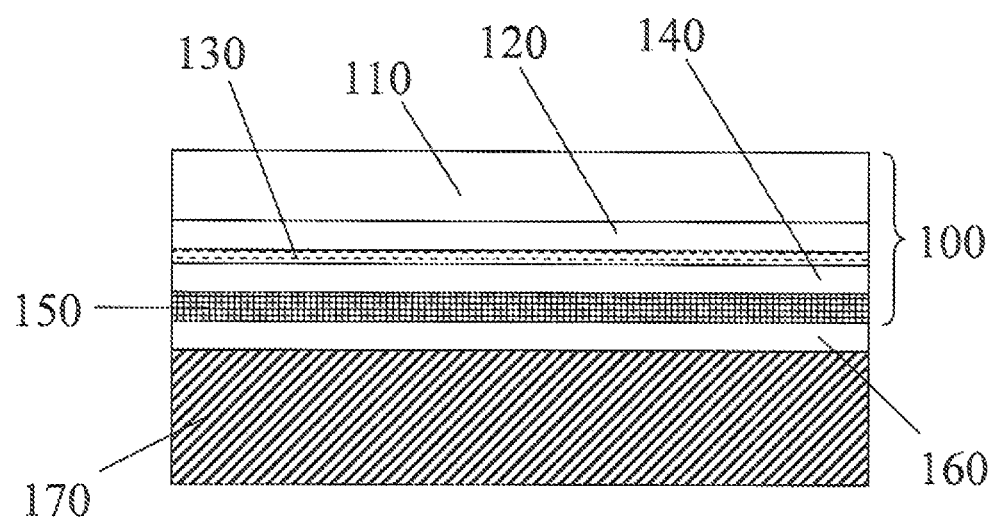

ENHANCED BARRIER MULTIFUNCTIONAL COATINGS FOR NYLON FILMS

RELATED APPLICATIONS

This application claims the benefit of Unites States Provisional Application Ser. No. 61/151,286, filed on Feb. 10, 2009, the disclosure of which is incorporated by reference in its entirety.

FIELD OF THE INVENTION

The present technology relates to high barrier multilayer films incorporating a hydrophilic, unmodified clay. More particularly, the articles and processes described herein pertain to insulation facing composite materials incorporating an oriented nylon layer coupled with a multifunctional moisture barrier membrane having enhanced barrier properties and a reduced coefficient of friction.

DESCRIPTION OF RELATED ART

Insulation products, commonly used in commercial and residential buildings, conventionally comprise a low-density batt of fibrous material, such as spun fiberglass or the like, that is coupled with a facing material on one of its major surfaces for added physical strength, product integrity and vapor barrier properties. One common building insulation facing material is asphalted (asphalt-coated) kraft paper. Kraft paper is a strong wrapping paper made from pulp processed with a sulfur solution, and coated with asphalt as a gas barrier material and also as an adhesive for adhering the kraft paper to insulation batting.

Separately, polymeric articles made from multiple layers of different plastics are known to be able to achieve various desired physical and chemical properties, including physical characteristics such as good toughness and wear resistances, as well as barrier properties to the transmission of oxygen, carbon dioxide, water and water vapor. While building insulation assemblies faced with asphalted kraft paper have been an industry standard for years, the versatility and excellent performance of plastic films have presented polymeric facings as very attractive options in the industry.

For example, as one alternative to asphalted kraft paper, polymer-coated kraft paper facings have been used. See, for example, U.S. Pat. Nos. 6,815,380 and 6,924,243 which teach polymer-kraft paper laminates for use in faced building insulation assemblies. Paper-free alternatives are also known, where the insulation facing consists only of polymer layers. See, for example, U.S. Pat. Nos. 5,733,624, 5,746,854, 6,191,057 and 6,357,504 which disclose polymeric facings for building insulation materials.

Water vapor barrier insulation facings are often highly desirable to prevent moisture-laden air from a warm dwelling interior from entering the insulation, thereby protecting the insulation from damage due to condensation. Typically, insulation products incorporating a vapor barrier are used to insulate interior wall, floor, or ceiling cavities that separate a warm living area from a cold area, such as the home exterior. In such applications, the vapor barrier is typically placed adjacent the warm area to prevent warm, moist air from diffusing toward the cold space where it would cool and condense within the insulation. However, in some applications, an insulation product that does not provide a vapor barrier is desired, where water vapor is allowed to pass through fairly easily. For example, attic insulation intended for installation over existing attic insulation should not include a vapor barrier.

Some thermoplastic polymers, such as polyvinylidene chloride (PVdC), are natural barriers to gases such as oxygen and water vapor. Nevertheless, the barrier properties of thermoplastic polymer films can be augmented by incorporating a nanometer scale platelet type clay, also known as a nanoclay, into the polymer film. Such nanoclays are normally composed of montmorillonite or hectorite type smectite clays. Conventionally, a nanoclay is dispersed into a monomer or polymer base after it has been treated (modified) with organic molecules, such as organic ammonium ions, to insert the organic molecules between adjacent planar silicate layers, thereby increasing the interlayer spacing between the adjacent silicate layers. This process is known as intercalation and the resulting treated clay is called a "modified clay" or an "organoclay." The intercalation of the clay also makes the clay hydrophobic, making such modified clays highly desirable in water vapor barrier films. See, for example, U.S. Pat. No. 6,403,231, which teaches thermoplastic film structures having a good vapor barrier that is achieved by incorporating a polymer nanocomposite comprising modified nanoclay into the film structures. Additionally, U.S. Pat. No. 5,876,812 teaches containers made of polymeric material which contain a nanoclay treated with a surfactant to improve the oxygen and carbon dioxide barriers of the polymer.

While many applications require a superior water vapor or other gas barrier property, in some applications it is more desirable to have a variable vapor barrier that will exhibit variable permeation of gases when exposed to different environmental or ambient conditions. For example, the direction of moisture flow is generally from inside to outside when the exterior air is cold and dry, such as in the winter months, and from outside to inside when the air is hot and humid, such as in the summer months. Accordingly, it is common practice to use a vapor barrier such as polyethylene (PE) film on the warm side of the insulation to prevent moisture diffusion from the interior heated space to the exterior cold environment. Such vapor barriers reduce the potential for moisture condensation in the interior wall space when the water vapor is exposed to cold exterior temperatures and also ensure minimal heat loss from the interior. However, the same polyethylene vapor barrier increases the likelihood of moisture condensation at the insulation-PE film interface during hot, humid summer conditions where moisture flow is from outside to inside.

SUMMARY OF THE INVENTION

The articles and processes described herein pertain to insulation facing composite materials incorporating an oriented nylon layer coupled with a multifunctional moisture barrier membrane having enhanced barrier properties and a reduced coefficient of friction. Examples of multilayer films and articles described herein can provide a vapor barrier material that has a good vapor barrier during conditions of low ambient humidity in the winter, but a lower vapor barrier during humid summer conditions, allowing high moisture permeance.

In one aspect, a multilayer film is provided that includes: a) a selectively permeable outer layer; b) optionally an intermediate adhesive primer layer; c) a moisture barrier membrane comprising a nanoclay dispersed in a moisture barrier polymer, wherein the nanoclay content is from greater than zero to about 10% by weight of the moisture barrier polymer; d) a first adhesive tie layer; and e) a fibrous substrate on the first adhesive tie layer.

In another aspect, a method of producing a multilayer film is provided that includes the steps of a) providing a selectively permeable outer layer; b) optionally applying an intermediate adhesive primer layer onto the selectively permeable outer layer; c) applying a moisture barrier membrane onto the selectively permeable outer layer, the moisture barrier membrane comprising a nanoclay dispersed in a moisture barrier polymer, wherein the nanoclay content is from greater than zero to about 10% by weight of the moisture barrier polymer; d) applying a first adhesive tie layer onto the moisture barrier membrane; and e) applying a fibrous substrate on the first adhesive tie layer.

BRIEF DESCRIPTION OF THE DRAWINGS

Specific examples have been chosen for purposes of illustration and description, and are shown in the accompanying drawings, forming a part of the specification.

FIG. 1 is a plan-view, schematic representation of one embodiment of a multilayered article including a fibrous substrate, which article is useful as an insulation facing material.

DETAILED DESCRIPTION

As illustrated in FIG. 1, the multilayer films and articles can comprise at least one moisture barrier membrane 130 formed from a moisture barrier polymer compounded with a hydrophilic, particulate nanometer-scale clay, also known in the art as a nanoclay. Nanoclays are layered silicates and are naturally hydrophilic. For the purposes of the present invention, suitable nanoclays are untreated or unmodified, where an "untreated nanoclay" or "unmodified nanoclay" has the same meaning and is defined herein as a nanoclay that has not been reacted with, ion exchanged with, or complexed with any surfactant, organoammonium salt or any other intercalant compound that migrates in between layers of the nanoclay forming a complex having altered properties. This particularly means that the nanoclay is not complexed with any compound or material that affects the natural hydrophilicity of the clay. Such clays are specifically exclusive of organoclays, which are nanoclays that have been organically modified or treated with organocations (typically quaternary alkylammonium ions) to exchange the original interlayer cations for organocations (typically quaternary alkylammonium ions) to provide the clay with an organophilic, hydrophobic surface. With the untreated unmodified nanoclay, the moisture barrier membrane 130 will have a controlled low coefficient of friction (surface to surface and film to metal coefficient of friction) that is independent of relative humidity. In this regard, particularly good results can be achieved where the membrane 130 comprises a PVdC polymer.

Suitable clays are described, for example, in U.S. Pat. No. 5,747,560, which is incorporated herein by reference. Suitable clays include, but are not limited to unmodified natural or unmodified synthetic phyllosilicate such as montmorillonite, pyrophyllite, hectorite, vermiculite, beidilite, saponite, nontronite, fluoromica or a combination thereof. Unmodified mica and talc clays are also suitable. In some preferred examples, the clay can be montmorillonite, hectorite or synthetic fluoromica. More preferably, the clay can be montmorillonite or hectorite, and most preferably the clay can be montmorillonite. In some examples, the nanoclay can have an average platelet thickness in the range of from about 1 nm to about 100 nm and an average length and average width each in the range of from about 50 nm to about 500 nm. The clay preferably has an aspect ratio of from about 50 to about 1000, more preferably from about 100 to about 300, most preferably about 300.

The nanoclay can be dispersed in a moisture barrier polymer. As used herein, a moisture barrier polymer comprises a material which, in the absence of a hydrophilic nanoclay, has a constant film moisture permeability rate as measured by ASTM E96. ASTM E96 measures the weight of water in grams that pass through one square meter of a material in a 24-hour period. Permeance is a measure of the permeability of a material to water vapor divided by its thickness in inches, and is expressed in units of perms. A metric perm value of 1.0 perm means that under a vapor pressure differential of 1 mm of mercury, 0.66 grams of water vapor will diffuse through each square meter (m2) of surface per 24 hours. Particularly, the moisture barrier polymer comprises a material which, in the absence of a hydrophilic nanoclay, has a moisture film permeability rate of about 1 perm or less at 25% relative humidity ("RH") and 21° C. according to the 50% desiccant, dry-cup method of ASTM E96, Procedure A; and the same moisture permeability rate of about 1 perm or less at 95% RH and 21° C. according to the 90% wet-cup method of ASTM E96, Procedure B.

When a nanoclay is added, moisture barrier membrane 130 can have a film moisture permeability rate of about 1 perm or less at 25% relative humidity ("RH") and 21° C. according to the 50% desiccant, dry-cup method of ASTM E96, Procedure A; and can have a moisture permeability rate of from about 1 perm to about 40 perm at 95% RH and 21° C. according to the 90% wet-cup method of ASTM E96, Procedure B. Preferably, including the nanoclay, moisture barrier membrane 130 can comprise a material that has a film moisture permeability rate of about 0.5 perm or less at 25% RH and 21° C. as determined by ASTM E96, Procedure A (50% dry cup), and from about 5 perm to about 40 perm at 95% RH and 21° C. as determined by ASTM E96, Procedure B (90% wet cup). More preferably, including the nanoclay, moisture barrier membrane 130 can comprise a material that has a film moisture permeability rate of about 0.25 perm or less at 25% RH and 21° C. as determined by ASTM E96, Procedure A (50% dry cup), and from about 20 perm to about 40 perm at 95% RH and 21° C. as determined by ASTM E96, Procedure B (90% wet cup).

Useful polymers suitable to form a moisture barrier membrane 130 having these moisture barrier properties include, but are not limited to, polyvinylidene chloride, polyvinyl alcohol (PVOH), polyvinyl acetate (PVA), polyolefins including polyethylenes and polypropylene, polyamides, extrudable grade ethylene vinyl acetate (EVA), extrudable grade ethylene acrylic acid (EAA), ethylene vinyl alcohol copolymers (EVOHs) and combinations thereof. For example, the moisture barrier membrane 130 can comprise a polyvinylidene chloride polymer.

In some examples, a biaxially oriented moisture barrier membrane 130 including a nanoclay that achieves the above perm values can have a coating weight of from about 0.05 lb/ream (ppr) to about 1.2 lb/ream, more preferably from about 0.07 lb/ream to about 0.5 lb/ream, and most preferably from about 0.07 lb/ream to about 0.09 lb/ream. In other examples, an off-line, cast (i.e. non-oriented) moisture barrier membrane 130 including a nanoclay that achieves the above perm values can have a coating weight of from about 1.0 lb/ream to about 5.0 lb/ream, more preferably from about 2.0 lb/ream to about 3.5 lb/ream, and most preferably from about 2.5 lb/ream to about 3.0 lb/ream. Including a platelet nanoclay in the membrane 130 can allow for lower coating weights of the membrane 130 to attain low moisture vapor transmission rates compared to moisture barrier materials without the nanoclay.

In one example, the moisture barrier membrane 130 comprises a polyvinylidene chloride (PVdC) nanocomposite membrane having the following properties:

| Film (in²/lb) | Yield (in²/lb) | Base weight (gram/M²) | Base weight oz/yd² | Coating weight (lb/ream) |
|---|---|---|---|---|
| 0.2 ga PVdC | 8,640,000 | 0.08 | 0.0024 | 0.05 |
| 20 ga PVdC | 86,400 | 8.15 | 0.24 | 5.0 |
| 4 ga PVdC | 432,000 | 1.63 | 0.048 | 1.0 |

The moisture barrier membrane 130 can also provide the added advantage of excellent heat sealing characteristics by using the coating as a heat sealant material. For example, a PVdC coating provides an improved heat seal capability, having a heat seal temperature of 300° F. (148.9° C.) compared to 350° F. (176.7° C.) for PLA. Some coatings also reduce the wrinkling tendency of the film and improve the bond of adhesive materials between the moisture barrier membrane 130 and other layers, such as the fibrous substrate 150 (e.g. strong bonding of acrylic copolymers and other adhesives to PVdC).

To form a moisture barrier membrane 130, the moisture barrier polymer can be, for example, melt compounded or blended with the nanoclay platelets to form a polymer nanocomposite. A nanocomposite can alternately be formed by first providing a mixture of at least one monomer and at least one nanoclay followed by initiating an in-situ polymerization reaction in the mixture to cause the at least one monomer to polymerize. As used herein, a "nanocomposite" is a polymer structure that comprises a polymer matrix (e.g. PVdC) having a nanometer-scale additive (i.e. nanoclay particles/platelets) distributed evenly therein. The polymer-nanoclay blend or nanocomposite can then be formed into a suitable layer using conventional techniques, such as extrusion. Nanocomposites and methods for their formation are well known in the art. In some examples, the moisture barrier membrane 130 can comprise a nanoclay content of greater than zero to about 10% by weight of the moisture barrier polymer, greater than zero to about 5% by weight of the moisture barrier polymer, greater than zero to about 2% by weight of the moisture barrier polymer, or about 1% to about 2% by weight of the moisture barrier polymer. In such examples, the moisture barrier polymer can comprise about 90.0% or more by weight of said moisture barrier membrane 130, about 95% or more by weight of said moisture barrier membrane 130, or about 98% or more by weight of said moisture barrier membrane 130. Commercially available examples of PVdC emulsions include Serfene™ emulsions from Rohm and Haas Company of Philadelphia, Pa., particularly Serfene™ 2022 and 2026 primerless.

The moisture barrier membrane 130 can be attached on one surface to a selectively permeable outer layer 110. As used herein, a "selectively permeable" layer is a non-porous, monolithic layer that is permeable to water vapor but impermeable to liquid water. Suitable selectively permeable outer layer 110 materials non-exclusively include thermoplastic polymers such as polyamides, polyesters, acrylic polymers, polyurethanes, epoxies, ethylene vinyl alcohol (EVOH) copolymers, polylactic acid (PLA), or a combination thereof.

In some embodiments of the invention, the selectively permeable outer layer 110 can comprise a polyamide or nylon layer. Nylons are conventionally used in the art of multilayered packaging films. Suitable nylons non-exclusively include homopolymers or copolymers selected from aliphatic polyamides and aliphatic/aromatic polyamides having a molecular weight of from about 10,000 to about 100,000. General procedures useful for the preparation of polyamides are well known to the art. Such include the reaction products of diacids with diamines. Useful diacids for making polyamides include, for example, dicarboxylic acids which are represented by the general formula:

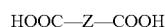

HOOC—Z—COOH wherein Z is representative of a divalent aliphatic radical containing at least 2 carbon atoms, such as adipic acid, sebacic acid, octadecanedioic acid, pimelic acid, suberic acid, azelaic acid, dodecanedioic acid, and glutaric acid. The dicarboxylic acids can be, for example, aliphatic acids, or aromatic acids such as isophthalic acid and terephthalic acid. Suitable diamines for making polyamides include, for example, those having the formula:

H₂N(CH₂)ₙNH₂ wherein n has an integer value of 1-16, which can include, for example, such compounds as trimethylenediamine, tetramethylenediamine, pentamethylenediamine, hexamethylenediamine, octamethylenediamine, decamethylenediamine, dodecamethylenediamine, hexadecamethylenediamine, aromatic diamines such as p-phenylenediamine, 4,4'-diaminodiphenyl ether, 4,4'-diaminodiphenyl sulfone, 4,4'-diaminodiphenylmethane, alkylated diamines such as 2,2-dimethylpentamethylenediamine, 2,2,4-trimethylhexamethylenediamine, and 2,4,4-trimethylpentamethylenediamine, as well as cycloaliphatic diamines, such as diaminodicyclohexylmethane, or other compounds. Other useful diamines include, for example, heptamethylenediamine, nonamethylenediamine, and the like.

Useful polyamide homopolymers include, for example, poly(4-aminobutyric acid) (nylon 4), poly(6-aminohexanoic acid) (nylon 6, also known as poly(caprolactam)), poly(7-aminoheptanoic acid) (nylon 7), poly(8-aminooctanoic acid) (nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12), nylon 4,6, poly(hexamethylene adipamide)(nylon 6,6), poly(hexamethylene sebacamide)(nylon 6,10), poly(heptamethylene pimelamide)(nylon 7,7), poly(octamethylene suberamide)(nylon 8,8), poly(hexamethylene azelamide) (nylon 6,9), poly(nonamethylene azelamide)(nylon 9,9), poly(decamethylene azelamide)(nylon 10,9), poly(tetramethylenediamine-co-oxalic acid) (nylon 4,2), the polyamide of n-dodecanedioic acid and hexamethylenediamine (nylon 6,12), the polyamide of dodecamethylenediamine and n-dodecanedioic acid (nylon 12,12) and the like. Useful aliphatic polyamide copolymers include, for example, caprolactam/hexamethylene adipamide copolymer (nylon 6,6/6), hexamethylene adipamide/caprolactam copolymer (nylon 6/6,6), trimethylene adipamide/hexamethylene azelaiamide copolymer (nylon trimethyl 6,2/6,2), hexamethylene adipamide-hexamethylene-azelaiamide caprolactam copolymer (nylon 6,6/6,9/6) and the like. Other nylons not particularly delineated here can also be suitable. In some examples utilizing polyamides, the polyamide can be selected from the group consisting of nylon 6, nylon 6,6, nylon 6/6,6 and mixtures thereof.

Aliphatic polyamides used in the practice of this invention can be obtained from commercial sources or prepared in accordance with known preparatory techniques. For example, poly(caprolactam) can be obtained from Honeywell International Inc., Morristown, N.J. under the trademark CAPRON®.

Suitable aliphatic and aromatic polyamides include poly (tetramethylenediamine-co-isophthalic acid) (nylon 4,1), polyhexamethylene isophthalamide (nylon 6,1), hexamethylene adipamide/hexamethylene-isophthalamide (nylon 6,6/61), hexamethylene adipamide/hexamethylene-terephthalamide (nylon 6,6/6T), poly(2,2,2-trimethyl hexamethylene terephthalamide), poly(m-xylylene adipamide) (MXD6), poly(p-xylylene adipamide), poly(hexamethylene terephthalamide), poly(dodecamethylene terephthalamide), polyamide 6T/6I, polyamide 6/MXDT/I, polyamide MXDI, and the like. Blends of two or more aliphatic or aromatic polyamides can also be used. Aliphatic and aromatic polyamides can be prepared by known preparative techniques or can be obtained from commercial sources. Other suitable polyamides are described in U.S. Pat. Nos. 4,826,955 and 5,541,267, which are incorporated herein by reference.

Selectively permeable outer layer 110 can optionally be attached to the moisture barrier membrane 130 via an intermediate adhesive primer layer. The adhesive primer layer can be applied either directly onto the selectively permeable outer layer 110 or onto the moisture barrier membrane 130 by any appropriate means in the art, such as by coating. Each adhesive layer described herein, including the adhesive primer layer and any adhesive tie layer, can comprise any suitable adhesive material as would be determined by one skilled in the art. Suitable adhesives non-exclusively include polyurethanes, epoxies, ethylene vinyl acetate copolymer, polyesters, acrylics, anhydride modified polyolefin and blends thereof. Modified polyolefin compositions can have at least one functional moiety selected from the group consisting of unsaturated polycarboxylic acids and anhydrides thereof. Such unsaturated carboxylic acid and anhydrides can include maleic acid and anhydride, fumaric acid and anhydride, crotonic acid and anhydride, citraconic acid and anhydride, itaconic acid, an anhydride and the like. In at least one example, the adhesive primer layer can be a one or two component urethane. Suitable urethane based adhesives are commercially available, for example, from Henkel Technologies, based in Düsseldorf, Germany, including polyurethanes commercially available from the Liofol Company (a division of Henkel Technologies) under the trademark TYCEL®.

Each adhesive primer layer or adhesive tie layer described herein can have a coating weight of about 0.5 lb/ream to about 6 lb/ream, and more preferably from about 1.0 lb/ream to about 4.0 lb/ream. Some examples of adhesive layers can have the following properties:

| Item | Adhesive dry coating weight in various units | | |
|---|---|---|---|
|  | lb/ream | gram/M$^2$ | oz/yard$^2$ |
| 0.5 ppr adhesive | 0.5 | 0.8 | 0.02 |
| 6.0 ppr adhesive | 6.0 | 10.0 | 0.29 |
| 1.5 ppr adhesive | 1.5 | 2.4 | 0.07 |

In one embodiment of the invention, illustrated in FIG. 1 (not drawn to scale), an article 100 is provided that is particularly useful as an insulation facing material, serving as a substitute for conventional asphalted kraft paper. As shown in FIG. 1, multilayer article 100 includes a selectively permeable outer layer 110 attached to a first surface of a moisture barrier membrane 130 optionally via an intermediate adhesive primer layer 120, and a fibrous substrate 150 attached to a second surface of the moisture barrier membrane 130 via a first adhesive tie layer 140. Also shown is an insulation material 170 that is attached to the fibrous substrate 150 via a second adhesive tie layer 160.

Adhesive layers 140 and 160 can be applied by any appropriate means in the art, such as by coating, onto a surface of either adjacent layer. Any suitable adhesive material can be employed. Preferred adhesives include the materials listed above for adhesive layers.

Fibrous substrate 150 can be either a woven or non-woven fabric. Preferably, the fibrous substrate is non-woven. More particularly, fibrous substrate 150 can comprise a tear resistant fabric, providing the multilayer structure with enhanced mechanical strength. Such tear resistant fabrics are preferably tear resistant in both the longitudinal (machine) and transverse directions and preferably have a tear resistance of greater than 25 g/fabric, more preferably greater than about 50 g/fabric, and most preferably greater than 100 g/fabric, as determined by the ASTM D1922-06a Elmendorf tear testing method. In one example, the fibrous substrate 150 comprises an open mesh, tear resistant fabric. As used herein, an open mesh, tear resistant fabric refers to a net-like fabric structure, or a scrim, comprising woven or non-woven polymeric fibers. The term scrim, as used herein, is used to describe any type of open mesh structure that is either woven or non-woven. Woven scrims can have any type of weave, and non-woven scrims are produced using any well known technique, including spun lace and spunbond techniques, such that it can be applied as a continuous roll. Suitable scrims are commercially available from, for example, Atlanta Nisseki CLAF, Inc. of Kennesaw, Ga., including SS and LS grade CLAF® materials.

Suitable polymeric fibers used to produce the fibrous substrate non-exclusively include polyamides, polyesters and polyolefins, particularly polyethylene and polypropylene, or a combination thereof. Suitable fibers also include biodegradable polymeric fibers, such as poly-ε-caprolactone biodegradable fibers, poly-β-propiolactone biodegradable fibers or a combination thereof. Particularly useful biodegradable non-woven fabrics useful herein are described in U.S. Pat. No. 5,506,041, which is incorporated herein by reference. Also preferred are fabrics produced from biodegradable INGEO® fibers commercially available from NatureWorks LLC and LACTRON® fibers commercially available from Kanebo, LTD. of Japan. The fibrous substrate can also comprise a fusible binder material, also known as a polymeric matrix material. Such binder or matrix materials are commonly used to consolidate multiple plies of non-woven fibers into monolithic non-woven fabrics. For example, the fibrous substrate can embody multiple overlapped plies, and can include from about 2 to about 5 overlapped and consolidated plies. Suitable matrixes for use herein non-exclusively include low modulus polymers, such as low modulus elastomers having an initial tensile modulus (modulus of elasticity) of less than about 6,000 psi (41.3 MPa) as measured at 37° C. by ASTM D638. Preferred low modulus polymeric matrix materials include styrenic block copolymers commercially available from Kraton Polymers of Houston, Tex. under the trademark KRATON®.

The fibrous substrate can comprise polypropylene, high density polyethylene, biodegradable fibers, or a combination thereof. One example of a suitable material for the fibrous substrate is non-woven, spunbond polypropylene fabric, such as fabric style #308092 commercially available from Sommers Inc. of Coral Gables, Fla. This type of fabric combines good tear strength, low smoke, and good softness properties. These are desirable characteristics for an insulation facing material. In some examples, the fibrous substrate can have an areal density of from about 6 g/m2 (gsm) to about 60 gsm, preferably from about 9 gsm to about 30 gsm, and more preferably from about 9 gsm to about 15 gsm.

One example of an insulation facing article can have the following structure: nylon/PVdC nanocomposite/adhesive/polypropylene non-woven fabric. In this example, the nylon layer can be nylon 6. As stated above, and as illustrated in FIG. 1, multilayer article 100 can be attached to an insulation material 170, serving as a facing material with a variable vapor barrier. Insulation material 170 can comprise any insulation material such as, for example, building insulation formed from fiberglass, mineral fibers, combinations of fiberglass and mineral fibers, or any other material that uses an insulation facing. Accordingly, another example of an insulation article can have the following structure: nylon/PVdC nanocomposite/adhesive/polypropylene non-woven fabric/adhesive/fiberglass insulation.

Multilayer films of the present technology can further include printed indicia on or between component layers. Such printing is typically on an internal surface of the structures and methods of application are well known in the art. As used herein, printed indicia will typically be applied onto the outer selectively permeable polymer layer.

Each of the selectively permeable outer layer 110, moisture barrier membrane 130, adhesive layers and other polymer layers described herein can optionally also include one or more conventional additives whose uses are well known to those skilled in the art. The use of such additives can be desirable in enhancing the processing of the compositions as well as improving the products or articles formed therefrom. Examples of such include: oxidative and thermal stabilizers, lubricants, release agents, flame-retarding agents, oxidation inhibitors, oxidation scavengers, dyes, pigments and other coloring agents, ultraviolet light absorbers and stabilizers, organic or inorganic fillers including particulate and fibrous fillers, reinforcing agents, nucleators, plasticizers, as well as other conventional additives known to the art. Such can be used in amounts, for example, of up to about 10% by weight of the overall composition. Representative ultraviolet light stabilizers include various substituted resorcinols, salicylates, benzotriazole, benzophenones, and the like. Suitable lubricants and release agents include stearic acid, stearyl alcohol, and stearamides. Exemplary flame-retardants include organic halogenated compounds, including decabromodiphenyl ether and the like as well as inorganic compounds. Suitable coloring agents including dyes and pigments include cadmium sulfide, cadmium selenide, titanium dioxide, phthalocyanines, ultramarine blue, nigrosine, carbon black and the like. Representative oxidative and thermal stabilizers include the Period Table of Element's Group I metal halides, such as sodium halides, potassium halides, lithium halides; as well as cuprous halides; and further, chlorides, bromides, iodides. Also, hindered phenols, hydroquinones, aromatic amines as well as substituted members of those above mentioned groups and combinations thereof. Exemplary plasticizers include lactams such as caprolactam and lauryl lactam, sulfonamides such as o,p-toluenesulfonamide and N-ethyl, N-butyl benzylnesulfonamide, and combinations of any of the above, as well as other plasticizers known to the art.

Although each layer of a multilayer film structure of the represent technology can have a different thickness, the thickness of the selectively permeable outer layer 110 is preferably from about 10 µm to about 50 µm, more preferably from about 12 µm to about 25 µm, and most preferably from about 12 µm to about 15 µm. The thickness of the moisture barrier membrane 130 is preferably very thin, preferably from about 0.03 µm to about 6 µm, more preferably from about 0.3 µm to about 3.0 µm, and more preferably about 0.3 µm to about 1.5 µm. It is most preferred that the moisture barrier membrane 130 have the lowest possible thickness for the selected moisture barrier polymer that is sufficient to achieve the perm values specified herein. Accordingly, in most embodiments the moisture barrier membrane 130 will have a thickness of about 4 µm or less, and will typically comprise at least about 0.6% of the total multilayer film thickness (excluding an insulation material). The thickness of the fibrous substrate is preferably from about 75 µm to about 250 µm, more preferably from about 100 µm to about 200 µm and most preferably from about 100 µm to about 150 µm. The thickness of the each adhesive primer layer and adhesive tie layer is preferably from about 1 µm to about 30 µm, more preferably from about 3 µm to about 20 µm, and most preferably from about 5 µm to about 15 µm. The overall multilayer films of the invention (excluding an insulation material) have a preferred total thickness of from about 400 µm to about 650 µm, more preferably from about 425 µm to about 625 µm and most preferably from about 450 µm to about 600 µm. While such thicknesses are preferred, it is to be understood that other film thicknesses can be produced to satisfy a particular need and yet fall within the scope of the present invention.

Multilayer articles of the present technology can be produced by conventional methods useful in producing multilayer films, including coating, extrusion or coextrusion, lamination, gravure coating, reverse gravure coating, extrusion coating and extrusion lamination techniques. In a typical coextrusion process, the polymeric material for the individual layers are fed into infeed hoppers of a like number of extruders, each extruder handling the material for one or more of the layers. The melted and plasticated streams from the individual extruders are directly fed to a multi-manifold die and then juxtaposed and combined into a layered structure or combined into a layered structure in a combining block and then fed into a single manifold or multi-manifold co-extrusion die. The layers emerge from the die as a single multiple layer film of polymeric material. After exiting the die, the film is cast onto a first controlled temperature casting roll, passed around the first roll, and then onto a second controlled temperature roll. The controlled temperature rolls largely control the rate of cooling of the film after it exits the die. Additional rolls can be employed. In another method, the film forming apparatus can be one which is referred to in the art as a blown film apparatus and includes a multi-manifold circular die head for bubble blown film through which the plasticized film composition is forced and formed into a film bubble which can ultimately be collapsed and formed into a film. Processes of coextrusion to form film and sheet laminates are generally known. Typical coextrusion techniques are described in U.S. Pat. Nos. 5,139,878 and 4,677,017. One advantage of coextruded films is the formation of a multilayer film in a one process step by combining molten layers of each of the film layers, as well as any other optional film layers, into a unitary film structure.

Alternately, the individual layers can first be formed as separate layers and then laminated together under heat and pressure with or without intermediate adhesive layers. Lamination techniques are well known in the art. Typically, laminating is done by positioning the individual layers on one another under conditions of sufficient heat and pressure to cause the layers to combine into a unitary film. Typically, the layers are positioned on one another, and the combination is passed through the nip of a pair of heated laminating rollers by techniques well known in the art. Lamination heating can be done at temperatures ranging from about 100° F. (37.78° C.) to about 300° F. (148.9° C.), preferably from about 150° F. (65.56° C.) to about 250° F. (121.1° C.), and more preferably at from about 150° F. (65.56° C.) to about 200° F. (93.33° C.), at pressures ranging from about 20 psi (137.9 kPa) to about 80 psi (551.6 kPa), more preferably from about 40 psi (275.8 kPa) to about 60 psi (413.7 kPa), for from about 10 seconds to about 3 minutes, preferably from about 20 seconds to about 1 minute.

Also suitable are conventional coating techniques or other non-extrusion deposition methods, such as extrusion coating. Extrusion coating is a process where a molten polymer is applied onto a solid support and passed onto a cooling cylinder at the contact of which the polymer adheres to the support. Typically, a combination of these techniques will be used to produce the multilayer articles of the invention. For example, the selectively permeable outer layer 110 can be a cast film, or can be coextruded with an intermediate primers layer. Extrusion coating is the preferred method for applying a moisture barrier membrane 130 onto the selectively permeable outer layer 110, particularly for a moisture barrier membrane 130 having a thickness of about 4 μm or less because the layer is too thin to be effectively extruded into a film. The first adhesive tie layer can be coated or extruded onto the moisture barrier membrane 130, or onto the fibrous substrate, and the fibrous substrate will typically be attached by lamination.

In order to improve interlayer adhesion, the selectively permeable outer layer 110 and/or the moisture barrier membrane 130 and/or the other layers, can optionally be subjected to a corona treatment. A corona treatment is a process in which a layer of material is passed through a corona discharge station giving the surface of the layer a charge that improves its ability to bond to an adjacent layer. If conducted on the moisture barrier membrane 130, corona treatment is preferably conducted after attachment to the selectively permeable outer layer 110. Preferably, the layer or layers are subjected to about 0.5 to about 3 kVA-min/m2 of corona treatment. More preferably, the corona treatment level is about 1.7 kVA-min/m2. Suitable corona treatment units are available from Enercon Industries Corp., Menomonee Falls, Wis. and from Sherman Treaters Ltd, Thame, Oxon, UK. Preferably the surface dyne level of the corona treated layer or layers is above 36 dynes, more preferably above 42 dynes, and most preferably above 50 dynes.

The moisture barrier membrane 130 and/or selectively permeable outer layer 110 can be uniaxially or biaxially oriented. Preferably, both the moisture barrier membrane 130 and selectively permeable outer layer 110 are biaxially oriented films. The moisture barrier membrane 130 and/or selectively permeable outer layer 110 can be films oriented to a draw ratio of from 1.5:1 to 5:1 biaxially in each of its machine (longitudinal) direction and transverse direction. As used herein, the term draw ratio is an indication of the increase in the dimension in the direction of draw. Preferably, both the moisture barrier membrane 130 and the selectively permeable outer layer 110 are simultaneously biaxially oriented, wherein the membrane 130 is applied in-line onto a cast outer layer 110 before biaxially orienting them together. For example, in an in-line coating process, the moisture barrier membrane 130 and the selectively permeable outer layer 110 are first attached to each other and then the combined plasticized layers are biaxially oriented together in both the machine and transverse directions at the same time. Typically, coat weights of about 0.9 lb/ream to about 5.0 lb/ream are achieved by reverse gravure (or similar) coating on the cast web prior to stretching, and stretching decreases the final coat weight by the stretch factor (e.g. ×10, to from about 0.09 lb/ream to about 0.5 lb/ream). This results in dramatic improvements in strength and toughness properties, and also enhances interlayer adhesion, thereby avoiding the need for an intermediate adhesive primer layer. In an off-line coating process, the selectively permeable outer layer 110 is typically biaxially oriented prior to application of the moisture barrier membrane 130 (e.g. by extrusion coating). In this case, only the selectively permeable outer layer 110 is oriented.

The moisture vapor transmission rate (MVTR) of the multilayered films described herein can be determined via the procedure set forth in ASTM F1249. For example, the overall multilayer film according can have a MVTR in a high humidity environment of about 27.0 g or less/100 in2/day (419 g/m2/day) of the overall film at 23° C. and 100% relative humidity (i.e. 60 perm or less); more preferably from about 2.25 g/100 in2/day (5 perm) to about 18.0 g/100 in2/day (40 perm) (from about 34.8 g/m2/day to about 278.7 g/m2/day), and most preferably from about 9.0 g/100 in2/day (20 perm) to about 18.0 g/100 in2/day (40 perm) (from about 139.4 g/m2/day to about 278.7 g/m2/day) of the overall film, as determined by water vapor transmission rate measuring equipment available from, for example, Mocon of Minneapolis, Minn. In another example, the overall multilayer film according to this invention has a MVTR in a low humidity environment of from about 0.45 g or less/100 in2/day (6.97 g/m2/day) of the overall film at 23° C. and 33% relative humidity (i.e. 1 peen or less), more preferably from about 0.225 g/100 in2/day (0.5 perm) to about 0.45 g/100 in2/day (1 perm) (from about 3.50 g/m2/day to about 6.97 g/m2/day), and most preferably from about 0.113 g/100 in2/day (0.25 perm) to about 0.225 g/100 in2/day (0.5 peen) (1.75 g/m2/day to about 3.50 g/m2/day) of the overall film.

The following non-limiting examples serve to illustrate some examples of the present technology.

Example 1

Samples of Capran® 2000 (50 μm cast nylon 6), Capran® 1000 (25 μm cast nylon 6) and Capran® Emblem® CE 1200 (12 μm biaxially oriented nylon 6) were obtained from Honeywell International, Inc. of Morristown, N.J. A sample of R19 kraft paper (asphalt coated) faced batt insulation was obtained from CertainTeed Corporation of Valley Forge, Pa. The kraft-faced batt sample had 6.25" (15.87 cm) of fiberglass attached to the asphalt coated paper facing. The fiberglass was removed from the asphalt facing prior to the permeance test. The asphalt side faced the high moisture condition throughout the test. This processing was to simulate the building condition for water vapor transport evaluation.

Samples of a biaxially ("biax") oriented nylon film coated with nanoclay-loaded PVdC (samples PFX07-30-A and PFX07-30-μ, two samples tested) were made by coating a PVdC-nanoclay water base coating (i.e. a PVdC nanocomposite, where montmorillonite nanoclay was added to an emulsion of PVdC in water) on a 100 μm thick nylon 6 casting film, where the nanoclay was added to an emulsion of PVdC in water. The coated film was put though a conventional oven dryer to remove the water prior to the biaxial stretching processing to make the biaxially oriented nylon 6 film. The dry PVdC nanocomposite coating weight prior to the biaxial orientation process was between about 0.7 to about 4.0 lbs per 3000 ft2 with the nanoclay loading at about 1% to 4%. The final coated biaxially oriented nylon film had the coating on one side without any blocking issue. The final film thickness was 13 μm. The final PVdC nanocomposite dry coating weight ranged from about 0.07 to about 0.4 lbs per 3000 ft2.

All the samples were subjected to permeance testing at 21° C. using ASTM E96 procedures A and B. The PVdC nanocomposite coated nylon went through the same testing with the high moisture condition facing the coated side. For dry condition (desiccant inside the testing cup), the coating side faced outside. For wet condition (water inside the testing cup), the coating side faced inside. The final perm values are shown in Table 1. As shown in Table 1, the PVdC nanocomposite coated nylon samples PFX07-30-A and PFX07-30-μ showed a lower perm value at 25% RH and much higher perm value at 95% RH than the commercial asphalt-coated kraft paper facing material.

TABLE 1

| Sample ID | Description | Permeance at 21° C. using ASTM E96 Procedures A and B (Perm Values) | | | |
|---|---|---|---|---|---|
| | | 50% RH Dry Cup 25% RH | 90% RH Dry Cup 45% RH | 50% RH Wet Cup 75% RH | 90% RH Wet Cup 95% RH |
| PFX07-30-A | 0.090 lb/ream PVdC with Nanoclay | 0.78 | 3.17 | 5.73 | 36.73 |
| CAPRAN® 2000 | 2 mil Cast Nylon | 0.69 | 4.12 | 8.77 | 35.85 |
| CAPRAN® 1000 | 1 mil Cast Nylon | 1.52 | 6.05 | 9.05 | 62.18 |
| PFX07-30-B | 0.085 lb/ream PVdC with Nanoclay | 0.73 | 2.77 | 11.28 | 40.71 |
| CertainTeed R19 Kraft Paper Faced Batt | Commercial Sample (Fiberglass Removed) | 1.28 | 1.75 | 2.08 | 8.51 |
| CAPRAN® EMBLEM® CE 1200 | 48 ga Biax Nylon | 2.13 | 6.82 | 8.56 | 47.27 |

Example 2

Samples of Caprano® 2000 (50 μm cast nylon 6), Capran® 1000 (25 μm cast nylon 6) and Capran® Emblem® CE 1200 (12 μm biaxially oriented nylon 6) were obtained from Honeywell International, Inc. of Morristown, N.J. A biaxially oriented nylon film coated with nanoclay-loaded PVdC (i.e. PVdC nanocomposite PFX07-30-A) was made by coating a PVdC-nanoclay water base coating on a 100 μm thick nylon 6 casting film. The coated film was put though a conventional oven dryer to remove the water prior to the biaxial stretching processing to make the biaxially oriented nylon 6 film. The dry PVdC nanocomposite coating weight prior to the biaxial orientation process was between about 0.7 to about 4.0 lbs per 3000 ft2 with the nanoclay loading at about 1% to 4%. The final coated biaxially oriented nylon film had the coating on one side without any blocking issue. The final film thickness was 13 μm. The final PVdC nanocomposite dry coating weight ranged from about 0.07 to about 0.4 lbs per 3000 ft2.

All the samples were subjected to moisture vapor transmission rate testing according to the ASTM F1249 testing method using PERMA TRAN-W® model 3-31 equipment manufactured by MOCON Inc. of Minneapolis, Minn. The testing temperature was set at 23° C. for all the samples. The final MVTR values are shown in Table 2 below. As shown in Table 2, the 13 μm of PFX07-30 had a similar moisture vapor transport rate as the 50 μm cast nylon (CAPRAN® 2000). It is believed that the biaxially oriented nylon film coated with the nanoclay-loaded PVdC achieved a moisture barrier rate equal to that of the 50 μm cast nylon that was 4× thicker, and the coated film had the same higher moisture vapor transmission rate as the humidity increased.

TABLE 2

| | MVTR Based On ASTM F1249 | | | | | |
|---|---|---|---|---|---|---|
| | MVTR (g/100 in²/day) | | | MVTR (g/m²/day) | | |
| Sample ID | % RH 33% 23° C. | % RH 65% 23° C. | % RH 100% 23° C. | % RH 33% 23° C. | % RH 65% 23° C. | % RH 100% 23° C. |
| PF X07-30-A | 0.2 | 0.7 | 8.8 | 3.7 | 10.6 | 136.9 |
| CAPRAN® 1000 | 0.7 | 1.7 | 26.7 | 10.4 | 25.9 | 415.1 |
| CAPRAN® 2000 | 0.2 | 0.9 | 13.0 | 2.7 | 13.6 | 201.0 |

Example 3

Commercially available PVdC emulsions, Serfene™ 2022 and 2026 from Rohm and Haas Company of Philadelphia, Pa., were tested as shown in Table 3 for OTR and WVTR, as were in-line coatings of low-Coefficient of Friction (COF) PVdC and primeness low-COF PVdC on CAPRAN® EMBLEM® CE films. These materials were also tested for COF as shown in Table 4. As shown in Table 4, also tested was a sample of CAPRAN® EMBLEM® CE 1500 with a primer coating which included 10% of a slip agent (WB2601 from HB Fuller Co. of St. Paul, Minn.). PVdC coating weights were 0.19 lb/ream. The following incomplete results were found:

TABLE 3

| Sample | OTR 1 | | OTR Av | OTR 2 | | OTR Av | WVTR |
|---|---|---|---|---|---|---|---|
| | 65% RH - 23° C. | | | 90% RH - 23° C. | | | |
| 2022 Undiluted | 1.83 | 1.76 | 1.79 | 4.21 | 4.62 | 4.42 | 6.05 |
| 2022 Diluted (4:1, 2022:water) | 1.91 | 1.89 | 1.90 | 3.98 | 3.76 | 3.87 | 4.98 |
| 2022 plus Nanoclay (3%), 50:50 Dilution with Water | 1.90 | 1.79 | 1.84 | 4.62 | 4.72 | 4.67 | 5.62 |
| 2026 Undiluted | 1.52 | 1.47 | 1.50 | 4.17 | 4.06 | 4.12 | 2.89 |
| 2026 Diluted (4:1, 2026:water) | 1.50 | 1.50 | 1.50 | | | | 10.94 |
| CAPRAN® EMBLEM ® CE | | | | | | | |

TABLE 3-continued

| Sample | OTR 1 65% RH - 23° C. | OTR Av | OTR 2 90% RH - 23° C. | OTR Av | WVTR |
|---|---|---|---|---|---|
| 1500 with primer coating + WB2601 | | | | | |
| Standard CAPRAN® EMBLEM® CE 1500 | 3-4 | | 10-20 | 20-23 | |
| Standard CAPRAN® EMBLEM® CE 1530 | 0.5-1 | | | | 0.76 |

TABLE 4

| Sample | COF Film to Film (Static) | | | COF film to Stainless Steel (Static) | | COF film to Film (Dynamic) | | | COF film to Stainless Steel (Dynamic) | |
|---|---|---|---|---|---|---|---|---|---|---|
| | 1-1 | 1-2 | 2-2 | Side 1 | Side 2 | 1-1 | 1-2 | 2-2 | Side 1 | Side 2 |
| 2022 Undiluted | n/a | n/a | n/a | n/a | n/a | n/a | n/a | n/a | n/a | n/a |
| 2022 Diluted (4:1, 2022:water) | n/a | n/a | n/a | n/a | n/a | n/a | n/a | n/a | n/a | n/a |
| 2022 plus Nanoclay (3%), 50:50 Dilution with Water | 0.5495 | 0.5115 | 1.08 | 0.2325 | 0.259 | 0.417 | 0.3375 | 0.522 | 0.175 | 0.159 |
| 2026 Undiluted | n/a | n/a | n/a | n/a | n/a | n/a | n/a | n/a | n/a | n/a |
| 2026 Diluted (4:1, 2026:water) | n/a | n/a | n/a | n/a | n/a | n/a | n/a | n/a | n/a | n/a |
| CAPRAN® EMBLEM® CE 1500 with primer coating + WB2601 | 0.32 | 0.594 | 0.4115 | 0.219 | 0.2375 | 0.1935 | 0.472 | 0.2935 | 0.153 | 0.16 |
| Standard CAPRAN® EMBLEM® CE 1500 | | | | | | | 0.8 | | 0.25 | |
| Standard CAPRAN® EMBLEM® CE 1530 | | | | | | | 0.8 | | 0.25 | |

From the foregoing, it will be appreciated that although specific examples have been described herein for purposes of illustration, various modifications can be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A multilayer film comprising, in order:
    a) a selectively permeable outer layer comprising a polyamide;
    b) optionally an intermediate adhesive primer layer;
    c) a moisture barrier membrane comprising a polyvinylidene chloride nanocomposite, said polyvinylidene chloride nanocomposite comprising an unmodified, non-intercalated, layered nanoclay dispersed in a polyvinylidene chloride polymer;
    d) a first adhesive tie layer; and
    e) a fibrous substrate on the first adhesive tie layer.

2. The multilayer film of claim 1, wherein the moisture barrier membrane consists essentially of an unmodified, non-intercalated, layered nanoclay dispersed in a polyvinylidene chloride polymer.

3. The multilayer film of claim 1, wherein the nanoclay content of the moisture barrier membrane is from greater than zero to about 2% by weight of the moisture barrier polymer.

4. The multilayer film of claim 1, wherein the moisture barrier membrane consists of an unmodified, non-intercalated, layered nanoclay dispersed in a polyvinylidene chloride polymer.

5. The multilayer film of claim 1, wherein the moisture barrier membrane has a coating weight of from about 0.05 lb/ream to about 1.2 lb/ream.

6. The multilayer film of claim 1, wherein the moisture barrier membrane has a moisture permeability rate of about 0.5 perm or less at 25% RH and 21° C. as determined by ASTM E96, Procedure A (50% dry cup), and from about 5 perm to about 40 perm at 95% RH and 21° C. as determined by ASTM E96, Procedure B (90% wet cup).

7. The multilayer film of claim 1, wherein the selectively permeable outer layer consists essentially of a biaxially oriented polyamide layer having a thickness of about 15 μm or less.

8. The multilayer film of claim 1, wherein the fibrous substrate comprises a non-woven fabric comprising biodegradable polymeric fibers.

9. The multilayer film of claim 8, wherein the fibrous substrate comprises multiple plies of non-woven fibers that are consolidated with a polymeric matrix material.

10. The multilayer film of claim 1, wherein the optional intermediate adhesive primer layer is present, and wherein the fibrous substrate comprises multiple plies of non-woven fibers that are consolidated with a polymeric matrix material.

11. The multilayer film of claim 1, wherein the amount of nanoclay in the moisture barrier membrane is from greater than zero to about 10% by weight relative to the weight of the moisture barrier polymer, and wherein the selectively permeable outer layer consists of a polyamide.

12. A multilayer article comprising an insulation material attached to the fibrous substrate of claim 1 via a second adhesive tie layer.

13. A multilayer film consisting of, in order:
a) a nylon 6 layer;
b) optionally, an intermediate adhesive primer layer;
c) a polyvinylidene chloride nanocomposite layer, said polyvinylidene chloride nanocomposite consisting of an unmodified, non-intercalated, layered nanoclay dispersed in a polyvinylidene chloride polymer;
d) a first adhesive tie layer; and
e) a fibrous substrate on the first adhesive tie layer.

14. A method of producing a multilayer film, comprising:
a) providing a selectively permeable outer layer comprising a polyamide;
b) optionally applying an intermediate adhesive primer layer onto the selectively permeable outer layer;
c) applying a moisture barrier membrane onto the selectively permeable outer layer, the moisture barrier membrane comprising a polyvinylidene chloride nanocomposite, said polyvinylidene chloride nanocomposite comprising an unmodified, non-intercalated, layered nanoclay dispersed in a polyvinylidene chloride polymer;
d) applying a first adhesive tie layer onto the moisture barrier membrane; and
e) applying a fibrous substrate on the first adhesive tie layer.

15. The method of claim 14, further comprising attaching an insulation material to the fibrous substrate via a second adhesive tie layer.

16. The method of claim 14, wherein the nanoclay content of the moisture barrier membrane is from greater than zero to about 2% by weight of the moisture barrier polymer.

17. The method of claim 14, wherein the selectively permeable outer layer comprises a biaxially oriented polyamide layer having a thickness of about 15 µm or less.

18. The method of claim 14, wherein the fibrous substrate comprises a non-woven fabric.

19. The method of claim 14, wherein the moisture barrier membrane has a coating weight of from about 0.05 lb/ream to about 1.2 lb/ream.

20. The method of claim 14, wherein the moisture barrier membrane has a moisture permeability rate of about 0.5 perm or less at 25% RH and 21° C. as determined by ASTM E96, Procedure A (50% dry cup), and from about 5 perm to about 40 perm at 95% RH and 21° C. as determined by ASTM E96, Procedure B (90% wet cup).

* * * * *